(12) United States Patent
Wang et al.

(10) Patent No.: US 12,063,695 B2
(45) Date of Patent: Aug. 13, 2024

(54) BEAM INDICATION METHOD AND APPARATUS

(71) Applicant: HUAWEI TECHNOLOGIES CO., LTD., Guangdong (CN)

(72) Inventors: Xiaolu Wang, Hangzhou (CN); Hejia Luo, Hangzhou (CN); Jianwei Zhou, Hangzhou (CN); Chenlei Xu, Hangzhou (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/706,202

(22) Filed: Mar. 28, 2022

(65) Prior Publication Data

US 2022/0225432 A1    Jul. 14, 2022

Related U.S. Application Data

(63) Continuation of application No. PCT/CN2020/115401, filed on Sep. 15, 2020.

(30) Foreign Application Priority Data

Sep. 30, 2019    (CN) .................. 201910944498.X

(51) Int. Cl.
*H04W 74/0833*    (2024.01)
*H04B 7/01*    (2006.01)
(Continued)

(52) U.S. Cl.
CPC .......... *H04W 74/0841* (2013.01); *H04B 7/01* (2013.01); *H04W 56/001* (2013.01);
(Continued)

(58) Field of Classification Search
CPC .......... H04W 74/0841; H04W 56/001; H04W 72/046; H04W 74/0866; H04W 84/06;
(Continued)

(56) References Cited

U.S. PATENT DOCUMENTS

| 2018/0279364 A1 | 9/2018 | Hui et al. |
| 2018/0279387 A1 | 9/2018 | Hui et al. |

(Continued)

FOREIGN PATENT DOCUMENTS

| CN | 1608352 A | 4/2005 |
| CN | 108696945 A | 10/2018 |

(Continued)

OTHER PUBLICATIONS

Zte, "Discussion on the TA and PRACH for NTN," 3GPP TSG RAN WG1 #98, R1-1909400, Prague, Czech Republic, Aug. 26-30, 2019, 9 pages.

(Continued)

*Primary Examiner* — Eric Myers
(74) *Attorney, Agent, or Firm* — Fish & Richardson P.C.

(57) ABSTRACT

The disclosure provides beam indication methods and apparatuses One example method includes that a terminal device determines first random access information associated with a first synchronization broadcast block (SSB) and associated with a beam parameter of a satellite beam, where the beam parameter is used to distinguish the satellite beam. The terminal sends a preamble to a satellite based on the first random access information. The satellite receives the preamble from the terminal, and determines the first random access information. The satellite determines the first SSB and the beam parameter of the satellite beam that are associated with the first random access information.

21 Claims, 7 Drawing Sheets

(51) Int. Cl.
*H04W 56/00* (2009.01)
*H04W 72/044* (2023.01)
*H04W 74/08* (2024.01)
*H04W 84/06* (2009.01)

(52) U.S. Cl.
CPC ..... *H04W 72/046* (2013.01); *H04W 74/0866* (2013.01); *H04W 84/06* (2013.01)

(58) Field of Classification Search
CPC ......... H04W 56/0035; H04W 74/0833; H04W 16/28; H04W 74/004; H04B 7/01; H04B 7/18513; H04B 7/0695; H04B 7/0408; H04B 7/0617; H04B 7/1853
See application file for complete search history.

(56) References Cited

U.S. PATENT DOCUMENTS

| | | | | |
|---|---|---|---|---|
| 2022/0159741 A1* | 5/2022 | Hoang | ............... | H04W 72/0453 |
| 2022/0263696 A1* | 8/2022 | Shin | ..................... | H04L 5/0051 |

FOREIGN PATENT DOCUMENTS

| | | |
|---|---|---|
| CN | 108810918 A | 11/2018 |
| CN | 109104226 A | 12/2018 |
| CN | 109151923 A | 1/2019 |
| CN | 109729580 A | 5/2019 |
| GB | 201906237 | 6/2019 |
| WO | 2018144844 A1 | 8/2018 |
| WO | 2018175705 A1 | 9/2018 |
| WO | 2019093764 A1 | 5/2019 |

OTHER PUBLICATIONS

Huawei et al., "Discussion on Doppler Compensation, Timing Advance and RACH for NTN," 3GPP TSG RAN WG1 Meeting #98, R1-1908049, Prague, Czech Republic, Aug. 26-30, 2019, 36 pages.

Extended European Search Report in European Appln No. 20871771.0, dated Oct. 5, 2022, 10 pages.

Office Action issued in Chinese Application No. 201910944498.X on Sep. 19, 2022, 12 pages.

Office Action issued in Chinese Application No. 201910944498.X on May 5, 2022, 20 pages (with English translation).

PCT International Search Report and Written Opinion issued in International Application No. PCT/CN2020/115401 on Dec. 3, 2020, 16 pages (with English translation).

* cited by examiner

BEAM INDICATION METHOD AND APPARATUS

CROSS-REFERENCE TO RELATED APPLICATIONS

This application is a continuation of International Application No. PCT/CN2020/115401, filed on Sep. 15, 2020, which claims priority to Chinese Patent Application No. 201910944498.X, filed on Sep. 30, 2019. The disclosures of the aforementioned applications are hereby incorporated by reference in their entireties.

TECHNICAL FIELD

Embodiments of this application relate to the field of communication technologies, and in particular, to a beam indication method and an apparatus.

BACKGROUND

In terrestrial communication, a beamforming (beamforming, BF) technology is used to improve a system capacity. In a phase in which a user terminal (user equipment, UE) initially accesses a network, beam (beam) selection needs to be completed. A base station broadcasts different synchronization signal blocks (synchronization signal blocks, SSBs) on different beams. The UE selects an appropriate SSB by detecting signal strength of the SSBs, determines a random access time-frequency resource and a preamble (preamble) that are corresponding to an index number of the SSB, and sends the preamble on the determined random access time-frequency resource. The base station determines, based on the preamble sent by the UE and the time-frequency resource on which the preamble is located, the beam selected by the UE.

Currently, various research institutions are studying evolution of terrestrial communication technologies and protocols to non-terrestrial network (Non-Terrestrial networks, NTN) communication. The NTN communication may be, for example, satellite communication. Different from a terrestrial communication network, each satellite/high-altitude platform/base station in the NTN communication has tens or even hundreds of beams. If one beam is used to broadcast one SSB in the NTN communication, more SSBs are required to support beam sweeping in the initial access phase of the UE. Currently, a maximum quantity of SSBs supported in the terrestrial communication is 64. Consequently, the terrestrial communication cannot support beam sweeping in the NTN communication.

SUMMARY

Embodiments of this application provide a beam indication method and an apparatus, to increase a quantity of beams supported by a quantity of available SSBs of a system.

Specific technical solutions provided in the embodiments of this application are as follows.

According to a first aspect, a beam indication method is provided. The method may be performed by a terminal, an apparatus located in the terminal, or a chip. For example, the method is performed by the terminal. The method includes the following steps: The terminal determines first random access information associated with a first synchronization broadcast block SSB and associated with a beam parameter of a satellite beam, where the beam parameter is used to distinguish the satellite beam. The terminal sends a preamble to a satellite based on the first random access information. The beam parameter of the satellite beam is added as a parameter associated with the random access information, so that when a same SSB is sent on a plurality of satellite beams, different satellite beams can be successfully distinguished. The SSB does not need to be in a one-to-one correspondence with the satellite beams, and the satellite beams may be reported. A quantity of beams supported by a quantity of available SSBs of a system is increased. When the satellite has a large quantity of beams, a small quantity of SSBs may be used to support sweeping of a large quantity of beams, so that SSB-based beam selection or reporting can be more easily implemented in the satellite field. In addition, if a coverage area of the satellite is divided into cells, because one SSB in combination with beam parameters may represent a plurality of beams, a maximum quantity of beams supported by one cell may be larger, and a quantity of cells obtained through division into the coverage area of the satellite may be reduced, so that a handover frequency of a terminal between cells is reduced, air interface resources are saved, and power consumption of the terminal is reduced.

According to a second aspect, a beam indication method is provided. The method is implemented through interaction between a terminal and a satellite. An operation performed on a terminal side may alternatively be performed by an apparatus in the terminal or a chip. The method includes the following steps: The terminal determines first random access information associated with a first synchronization broadcast block SSB and associated with a beam parameter of a satellite beam, where the beam parameter is used to distinguish the satellite beam. The terminal sends a preamble to the satellite based on the first random access information. The satellite receives the preamble from the terminal, and determines the first random access information. The satellite determines the first SSB and the beam parameter of the satellite beam that are associated with the first random access information. The beam parameter of the satellite beam is added as a parameter associated with the random access information, so that when a same SSB is sent on a plurality of satellite beams, different satellite beams can be successfully distinguished. The SSB does not need to be in a one-to-one correspondence with the satellite beams, and the satellite beams may be reported. A quantity of beams supported by a quantity of available SSBs of a system is increased. When the satellite has a large quantity of beams, a small quantity of SSBs may be used to support sweeping of a large quantity of beams, so that SSB-based beam selection or reporting can be more easily implemented in the satellite field. In addition, if a coverage area of the satellite is divided into cells, because one SSB in combination with beam parameters may represent a plurality of beams, a maximum quantity of beams supported by one cell may be larger, and a quantity of cells obtained through division into the coverage area of the satellite may be reduced, so that a handover frequency of a terminal between cells is reduced, air interface resources are saved, and power consumption of the terminal is reduced.

Based on the methods provided in the first aspect and the second aspect, examples are used below to describe some possible implementations based on the first aspect and the second aspect.

In a possible design, the beam parameter of the satellite beam includes an attribute of a Doppler offset value, and the attribute of the Doppler offset value is positive or negative. Random access information used by the UE in different beams that broadcast a same reference signal is distinguished by using positive and negative Doppler offsets. When a same quantity of reference signals are used, one cell can support more beams. In addition, sweeping of a plurality of beams is allowed to be performed simultaneously, thereby reducing time required for broadcasting the reference signal.

In a possible design, the terminal detects the attribute of the Doppler offset value. Alternatively, the terminal receives first information from the satellite, where the first information is used to indicate the attribute of the Doppler offset value; and the terminal determines the attribute of the Doppler offset value based on the first information.

In a possible design, the satellite sends the first information to the terminal, where the first information is used to indicate the attribute of the Doppler offset value.

In a possible design, the beam parameter of the satellite beam includes a first index number corresponding to the satellite beam. Random access information used by the UE in different beams that broadcast a same reference signal is distinguished by using index numbers. When a same quantity of reference signals are used, one cell can support more beams. In addition, sweeping of a plurality of beams is allowed to be performed simultaneously, thereby reducing time required for broadcasting the reference signal. The method further includes: The terminal receives the first index number from the satellite.

In a possible design, the beam parameter includes an attribute of a Doppler compensation value, and the attribute of the Doppler compensation value is positive or negative. The method further includes: The terminal receives the attribute of the Doppler compensation value corresponding to the satellite beam from the satellite. Random access information used by the UE in different beams that broadcast a same reference signal is distinguished by using positive and negative Doppler compensation values. When a same quantity of reference signals are used, one cell can support more beams. In addition, sweeping of a plurality of beams is allowed to be performed simultaneously, thereby reducing time required for broadcasting the reference signal.

In a possible design, the satellite sends, to the terminal, the attribute of the Doppler compensation value corresponding to the satellite beam.

In a possible design, that a terminal determines first random access information associated with a first SSB and associated with a beam parameter of a satellite beam includes: The terminal determines second random access information associated with the first SSB, where the second random access information includes the first random access information. The terminal determines the first random access information that is in the second random access information and associated with the beam parameter of the satellite beam.

In a possible design, the second random access information includes the first random access information and third random access information, and an intersection set of the first random access information and the third random access information is empty. The attribute of the Doppler offset value of the satellite beam is positively associated with the first random access information, and the attribute of the Doppler offset value of the satellite beam is negatively associated with the third random access information; or the attribute of the Doppler offset value of the satellite beam is negatively associated with the first random access information, and the attribute of the Doppler offset value of the satellite beam is positively associated with the third random access information. Random access information used by the UE in different beams that broadcast a same reference signal is distinguished by using positive and negative Doppler offsets. When a same quantity of reference signals are used, one cell can support more beams. In addition, sweeping of a plurality of beams is allowed to be performed simultaneously, thereby reducing time required for broadcasting the reference signal.

In a possible design, the second random access information includes a subset of the first random access information and at least one piece of third random access information, and an intersection set of the first random access information and any piece of third random access information is empty. The first index number corresponding to the satellite beam is associated with the first random access information. At least one second index number is in a one-to-one correspondence with the at least one piece of third random access information. Random access information used by the UE in different beams that broadcast a same reference signal is distinguished by using index numbers. When a same quantity of reference signals are used, one cell can support more beams. In addition, sweeping of a plurality of beams is allowed to be performed simultaneously, thereby reducing time required for broadcasting the reference signal.

In a possible design, the second random access information includes a subset of the first random access information and a subset of third random access information, and an intersection set of the first random access information and the third random access information is empty.

The Doppler compensation value of the satellite beam is positively associated with the first random access information, and the attribute of the Doppler compensation value of the satellite beam is negatively associated with the third random access information; or the attribute of the Doppler compensation value of the satellite beam is negatively associated with the first random access information, and the Doppler compensation value of the satellite beam is positively associated with the third random access information. Random access information used by the UE in different beams that broadcast a same reference signal is distinguished by using positive and negative Doppler compensation values. When a same quantity of reference signals are used, one cell can support more beams. In addition, sweeping of a plurality of beams is allowed to be performed simultaneously, thereby reducing time required for broadcasting the reference signal.

In a possible design, the method further includes: The terminal receives indication information from the satellite, where the indication information is used to indicate the terminal to determine random access information based on a beam parameter of a first beam.

In a possible design, the first random access information includes a random access resource and/or the preamble.

According to a third aspect, an apparatus is provided. The apparatus may be a terminal, an apparatus (for example, a chip, a chip system, or a circuit) in the terminal, or an apparatus that can be used in cooperation with the terminal. In a design, the apparatus may include modules that are in a one-to-one correspondence with the methods/operations/steps/actions described in the first aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the processing module is configured to determine first random access information associated with a first synchronization broadcast block SSB and associated with a beam parameter of a satellite beam, where the beam parameter is used to distinguish the satellite beam. The communication module is configured to send a preamble to a satellite based on the first random access information.

According to a fourth aspect, an apparatus is provided. The apparatus may be a satellite, an apparatus (for example, a chip, a chip system, or a circuit) in the satellite, or an apparatus that can be used in cooperation with the satellite. In a design, the apparatus may include modules that are in a one-to-one correspondence with the methods/operations/steps/actions performed by the satellite in the second aspect. The modules may be implemented by a hardware circuit, software, or a combination of a hardware circuit and software. In a design, the apparatus may include a processing module and a communication module. The processing module is configured to invoke the communication module to perform a receiving function and/or a sending function. For example, the communication module is configured to: receive a preamble from a terminal, and determine first random access information. The processing module is configured to determine a first SSB and a beam parameter of a satellite beam that are associated with the first random access information. The beam parameter is used to distinguish the satellite beam.

According to a fifth aspect, an embodiment of this application provides an apparatus. For example, the apparatus is a terminal. The apparatus includes a communication interface and a processor. The communication interface is used by the apparatus to communicate with another device, for example, to receive and send data or a signal. For example, the communication interface may be a transceiver, a circuit, a bus, a module, or a communication interface of another type, and the another device may be a satellite. The processor is configured to invoke a group of programs, instructions, or data to perform the method described in the first aspect. The apparatus may further include a memory, configured to store the programs, instructions, or data invoked by the processor. The memory is coupled to the processor. When the processor executes the instructions or data stored in the memory, the method described in the first aspect can be implemented.

According to a sixth aspect, an embodiment of this application provides an apparatus. For example, the apparatus is a satellite. The apparatus includes a communication interface and a processor. The communication interface is used by the apparatus to communicate with another device, for example, to receive and send data or a signal. For example, the communication interface may be a transceiver, a circuit, a bus, a module, or a communication interface of another type, and the another device may be a terminal. The processor is configured to invoke a group of programs, instructions, or data to perform the method performed by the satellite in the second aspect. The apparatus may further include a memory, configured to store the programs, instructions, or data invoked by the processor. The memory is coupled to the processor. When the processor executes the instructions or data stored in the memory, the method performed by the satellite in the second aspect can be implemented.

According to a seventh aspect, an embodiment of this application further provides a computer-readable storage medium. The computer-readable storage medium stores computer-readable instructions. When the computer-readable instructions are run on a computer, the computer is enabled to perform the method according to any one of the aspects or the possible designs of the aspects.

According to an eighth aspect, an embodiment of this application provides a chip system. The chip system includes a processor, and may further include a memory, configured to implement the method according to any one of the first aspect or the possible designs of the first aspect. The chip system may include a chip, or may include a chip and another discrete component.

According to a ninth aspect, an embodiment of this application provides a chip system. The chip system includes a processor, and may further include a memory, configured to implement the method performed by the satellite in any one of the second aspect or the possible designs of the second aspect. The chip system may include a chip, or may include a chip and another discrete component.

According to a tenth aspect, an embodiment of this application provides a system. The system includes a terminal and a satellite. The terminal is configured to perform the method according to any one of the first aspect or the possible designs thereof, and the satellite is configured to perform the method performed by the satellite in any one of the second aspect or the possible designs thereof.

According to an eleventh aspect, an embodiment of this application further provides a computer program product, including instructions. When the computer program product runs on a computer, the computer is enabled to perform the method according to any one of the aspects or the possible designs of the aspects.

DESCRIPTION OF EMBODIMENTS

Embodiments of this application provide a beam indication method and an apparatus, to implement beam selection in an NTN communication system. The method and the apparatus are based on a same concept. Because a problem-resolving principle of the method is similar to that of the apparatus, mutual reference may be made to implementations of the apparatus and the method. Repeated parts are not described in detail. In descriptions of the embodiments of this application, the term "and/or" describes an association relationship between associated objects and indicates that three relationships may exist. For example, A and/or B may indicate the following three cases: Only A exists, both A and B exist, and only B exists. The character "/" usually indicates an "or" relationship between the associated objects. In this application, "at least one" means one or more, and "a plurality of" means two or more. In addition, it should be understood that, in the descriptions of this application, the terms such as "first", "second", and "third" are merely used for differentiation and description, but cannot be understood as an indication or implication of relative importance or an indication or implication of an order.

A beam selection method provided in the embodiments of this application may be applied to a 4th generation (4th Generation, 4G) communication system, for example, a long term evolution (long term evolution, LTE) system; may be applied to a 5th generation (5th generation, 5G) communication system, for example, 5G new radio (new radio, NR); or applied to various future communication systems, for example, a 6th generation (6th generation, 6G) communication system.

The method provided in the embodiments of this application may be applied to a terrestrial network communication system, or may be applied to a non-terrestrial network (NTN) communication system.

Figure 1:
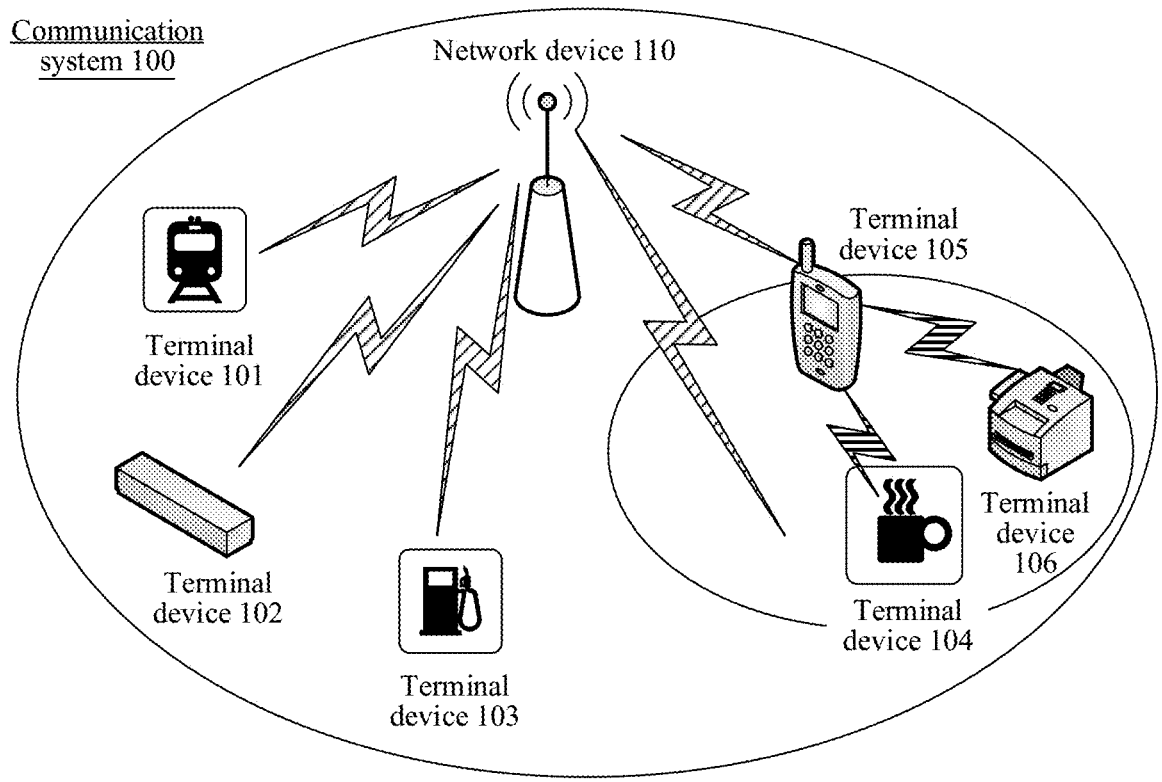
FIG. 1 is a schematic diagram of an architecture of a communication system according to an embodiment of this application.

FIG. 1 shows an architecture of a possible terrestrial network communication system to which a beam selection method provided in an embodiment of this application is applied. The communication system 100 may include a network device 110 and terminal devices 101 to 106. It should be understood that the communication system 100 may include more or fewer network devices or terminal devices. The network device or the terminal device may be hardware, may be software obtained through functional division, or may be a combination thereof. In addition, the terminal devices 104 to 106 may also form a communication system. For example, the terminal device 105 may send downlink data to the terminal device 104 or the terminal device 106. The network device or the terminal device may communicate with each other by using another device or network element. The network device 110 may send downlink data to the terminal devices 101 to 106, or may receive uplink data sent by the terminal devices 101 to 106. Certainly, the terminal devices 101 to 106 may also send uplink data to the network device 110, or may receive downlink data sent by the network device 110.

The network device 110 is a node in a radio access network (radio access network, RAN), and may also be referred to as a base station or a RAN node (or device). Currently, some examples of the access network device 110 are a gNB/NR-NB, a transmission reception point (transmission reception point, TRP), an evolved NodeB (evolved NodeB, eNB), a radio network controller (radio network controller, RNC), a NodeB (NodeB, NB), a base station controller (base station controller, BSC), a base transceiver station (base transceiver station, BTS), a home base station (for example, a home evolved NodeB or a home NodeB, HNB), or a baseband unit (baseband unit, BBU), an access point (access point, AP) in wireless fidelity (wireless fidelity, Wifi), a network device in a 5G communication system, or a network device in a possible future communication system.

The terminal devices 101 to 106 each may also be referred to as user equipment (user equipment, UE), a mobile station (mobile station, MS), a mobile terminal (mobile terminal, MT), or the like, and is a device that provides a user with voice or data connectivity, or may be an interne of things device. For example, the terminal devices 101 to 106 each include a handheld device, a vehicle-mounted device, or the like that has a wireless connection function. Currently, the terminal devices 101 to 106 each may be a mobile phone (mobile phone), a tablet computer, a notebook computer, a palmtop computer, a mobile internet device (mobile internet device, MID), a wearable device (for example, a smart watch, a smart band, or a pedometer), a vehicle-mounted device (for example, a car, a bicycle, an electric car, an airplane, a ship, a train, or a high-speed train), a virtual reality (virtual reality, VR) device, an augmented reality (augmented reality, AR) device, a wireless terminal in industrial control (industrial control), a smart home device (for example, a refrigerator, a television, an air conditioner, or a power meter), an intelligent robot, workshop equipment, a wireless terminal in self driving (self driving), a wireless terminal in remote medical surgery (remote medical surgery), a wireless terminal in a smart grid (smart grid), a wireless terminal in transportation safety (transportation safety), a wireless terminal in a smart city (smart city), a wireless terminal in a smart home (smart home), or a flight device (for example, an intelligent robot, a hot air balloon, a drone, or an airplane).

Figure 2:
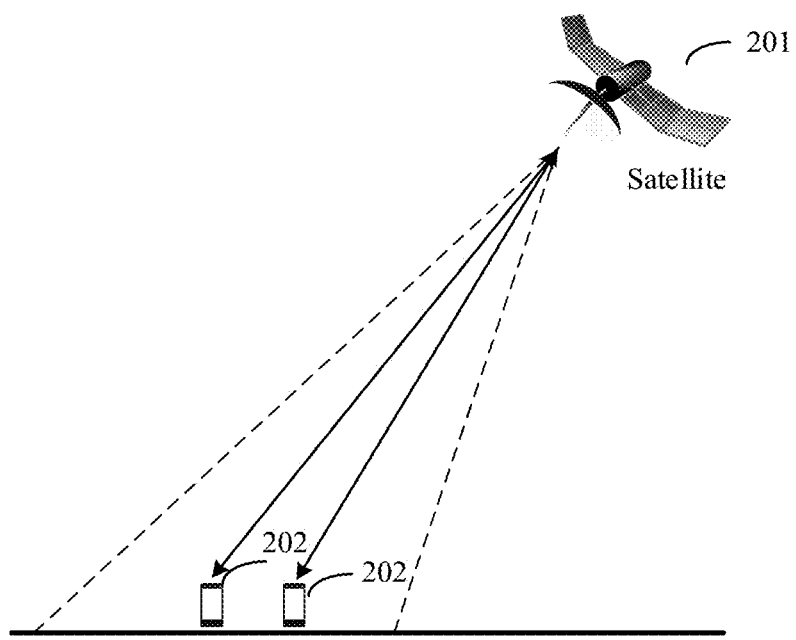
FIG. 2 is a schematic diagram of an architecture of an NTN communication system according to an embodiment of this application.

Based on the descriptions of the architecture of the terrestrial network communication system shown in FIG. 1, the beam selection method provided in the embodiments of this application is applicable to an NTN communication system. As shown in FIG. 2, the NTN communication system includes a satellite 201 and terminal devices 202. For explanation of the terminal device 202, refer to the related descriptions of the terminal devices 101 to 106. The satellite 201 may also be referred to as a high-altitude platform, a high-altitude aircraft, or a satellite base station. When the NTN communication system is associated with the terrestrial network communication system, the satellite 201 may be considered as one or more network devices in the architecture of the terrestrial network communication system. The satellite 201 provides a communication service for the terminal devices 202, and the satellite 201 may further be connected to a core network device. For a structure and a function of the network device 201, refer to the foregoing descriptions of the network device 201. For a communication manner between the satellite 201 and the terminal devices 202, refer to the descriptions in FIG. 1. Details are not described herein again.

The network device in the terrestrial network communication system and the satellite in the NTN communication system are all considered as network devices. An apparatus configured to implement a function of a network device may be a network device, or may be an apparatus, for example, a chip system, that can support the network device in implementing the function. The apparatus may be mounted in the network device. When the technical solutions provided in the embodiments of this application are described below, an example in which the apparatus configured to implement a function of a network device is a satellite is used to describe the technical solutions provided in the embodiments of this application. It may be understood that, when the method provided in the embodiments of this application is applied to the terrestrial network communication system, an action performed by the satellite may be performed by a base station or a network device. A satellite beam is replaced with a common beam.

In the embodiments of this application, an apparatus configured to implement a function of a terminal device may be a terminal device, or may be an apparatus, for example, a chip system, that can support the terminal device in implementing the function. The apparatus may be mounted in the terminal device. In the embodiments of this application, the chip system may include a chip, or may include a chip and another discrete component. In the technical solutions provided in the embodiments of this application, an example in which the apparatus configured to implement a function of a terminal device is a terminal or UE is used to describe the technical solutions provided in the embodiments of this application.

In the embodiments of this application, the term "communication" may also be described as "data transmission", "information transmission", or "transmission". The technical solutions may be used for wireless communication between a scheduling entity and a subordinate entity. Persons skilled in the art may use the technical solutions provided in the embodiments of this application to perform wireless communication between another scheduling entity and the subordinate entity, for example, wireless communication between a macro base station and a micro base station.

In high frequency communication, a path loss is very severe. Therefore, a beamforming (beamforming) technology is usually used to transmit signals in one direction, to compensate for the severe path loss. Because a beam is directional, both communication parties need to know directions, where beams in the directions can be aligned with the communication parties, to obtain better beam performance. In an NR communication system, a terminal performs initial beam selection in a random access procedure, and notifies a network device of a selected beam. The network device sends data to the terminal on the beam selected by the terminal, so that a relatively good beam gain can be obtained.

In NR, a primary synchronization signal (primary synchronization signal, PSS), a secondary synchronization signal (secondary synchronization signal, SSS), and a physical broadcast channel (physical broadcast channel, PBCH) are referred to as synchronization signal/broadcast signal blocks (synchronization signal/PBCH blocks, SS/PBCH blocks). In this application, for ease of description, the SS/PBCH block is referred to as an SSB.

Figure 3:
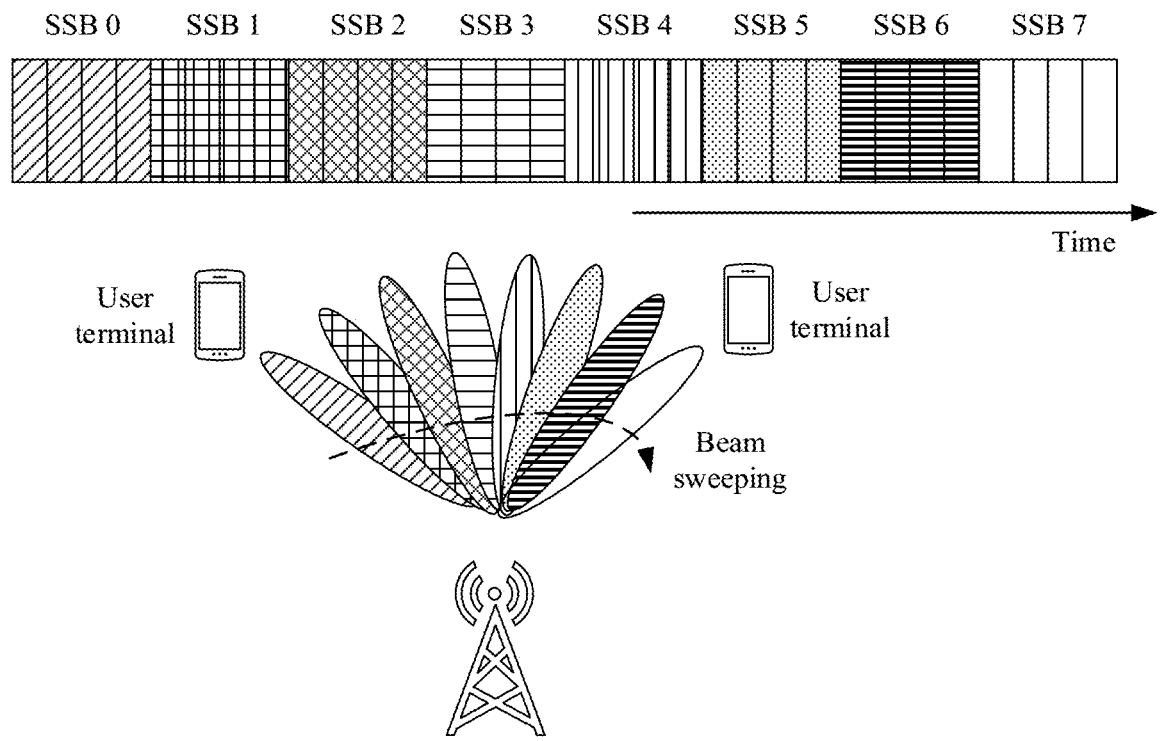
FIG. 3 is a schematic diagram of beam sweeping according to an embodiment of this application.

As shown in FIG. 3, in a possible implementation, a network device broadcasts SSBs through beam sweeping, for example, sequentially sends an SSB 0 to an SSB 7... in chronological order, and may send one SSB for each beam. A user terminal (namely, a terminal) detects a plurality of SSBs, selects any SSB whose reference signal received power (reference signal received power, RSRP) is greater than or equal to a threshold, and notifies the network device of the selected SSB in a random access procedure. In this way, the network device can learn of a beam corresponding to the SSB selected by the terminal.

The network device sends a broadcast message to the terminal in advance, and the terminal determines, based on the broadcast message, an association relationship among an SSB, a physical random access channel (physical random access channel, PRACH) time-frequency resource, and a random access preamble (preamble). The terminal sends, on a PRACH time-frequency resource associated with any SSB whose RSRP is greater than or equal to the threshold, a preamble associated with the SSB. The network device determines, based on a detected preamble sequence and a PRACH time-frequency resource on which the preamble sequence is located, an SSB selected by the terminal.

A quantity of available SSBs of a communication system is related to a used carrier frequency, as shown in Table 1.

TABLE 1

| Subcarrier spacing | Carrier frequency | Quantity of SSBs |
| --- | --- | --- |
| 15k | f < 3 GHz | 4 |
| 15k | 3 GHz < f < 6 GHz | 8 |
| 30k | f < 3 GHz | 4 |
| 30k | 3 GHz < f < 6 GHz | 8 |
| 120k | f > 6 GHz | 64 |
| 240k | f > 6 GHz | 64 |

It can be learned from Table 1 that:
(1) When the carrier frequency is less than 3 GHz, a cell supports a maximum of four SSBs.
(2) When the carrier frequency is greater than 3 GHz and less than 6 GHz, a cell supports a maximum of eight SSBs.
(3) When the carrier frequency is greater than 6 GHz, a cell supports a maximum of 64 SSBs.

In conclusion, a maximum quantity of available SSBs is 64. If more than 64 beams (beams) are supported by a coverage area of the network device, when broadcasting an SSB, the network device cannot broadcast one SSB for one beam. A quantity of SSBs supported by the system cannot support application of a beam selection solution, and an SSB-based beam reporting solution cannot be well implemented.

Figure 4:
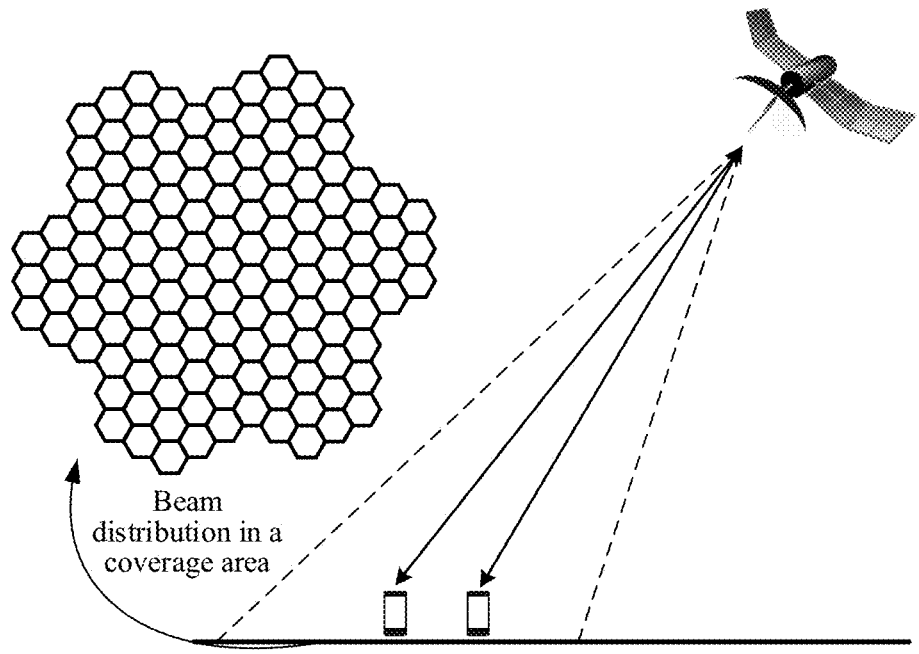
FIG. 4 is a schematic diagram of beam distribution under satellite coverage according to an embodiment of this application.

An NTN communication system is used as an example. As shown in FIG. 4, there are a plurality of beams in a coverage area of a satellite, and one hexagon in FIG. 4 represents one beam. There are dozens or even hundreds of beams in the coverage area of the satellite. Therefore, more SSBs are required to support beam sweeping, to implement an SSB-based beam selection solution or an SSB-based beam reporting solution.

If the coverage area of the satellite is divided into cells, because a maximum quantity of SSBs supported by a cell is limited, the coverage area of the satellite needs to be divided into a plurality of cells. In this way, an increase in a quantity of cells causes an increase in a handover frequency of the terminal between the cells. This wastes air interface resources and energy consumption of the terminal.

Figure 5:
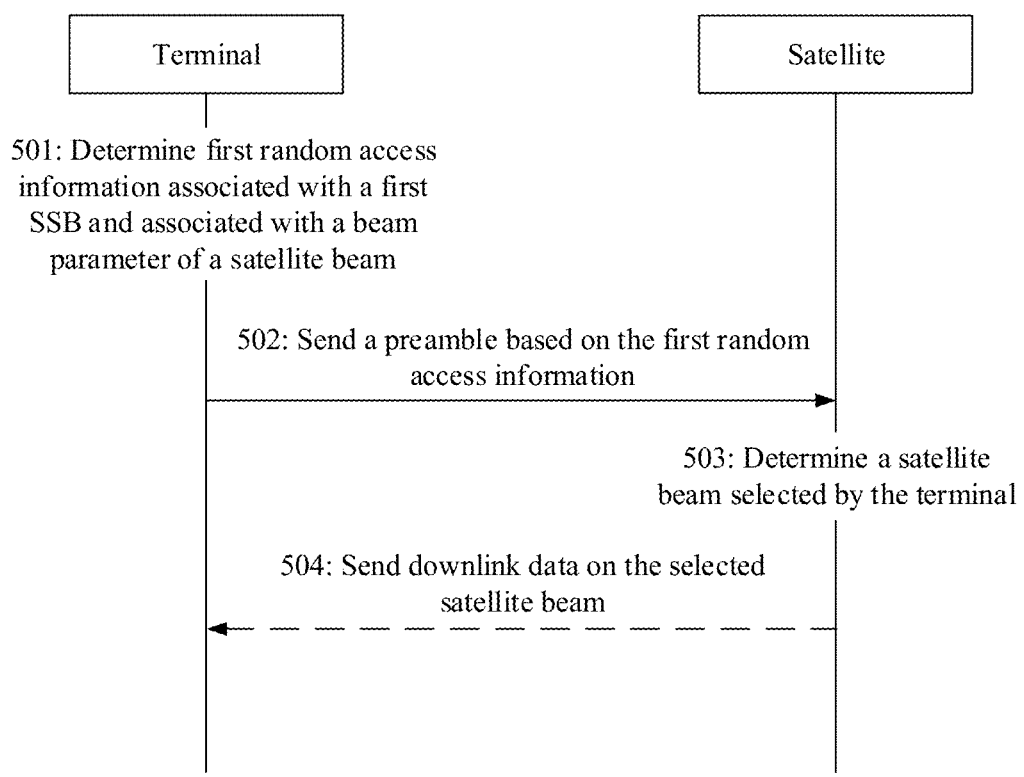
FIG. 5 is a schematic flowchart of a beam indication method according to an embodiment of this application.

As shown in FIG. 5, a specific procedure of a beam indication method provided in an embodiment of this application is described below. It should be noted that any steps may independently form a solution that needs to be protected in this embodiment of this application, and other steps are optional steps.

S501: A terminal determines first random access information associated with a first SSB and associated with a beam parameter of a satellite beam.

The beam parameter is used to distinguish the satellite beam. In other words, when a plurality of satellite beams use a same SSB, the plurality of satellite beams may be distinguished by using beam parameters.

It is assumed that the first SSB is associated with second random access information, and the second random access information includes the first random access information. Alternatively, the first random access information is a subset of the second random access information. After determining the second random access information associated with the first SSB, the terminal determines the first random access information that is in the second random access information and associated with the beam parameter of the satellite beam.

For example, two satellite beams are represented by a beam 1 and a beam 2, and both the beam 1 and the beam 2 are corresponding to an SSB 1. Beam parameters of the beam 1 and the beam 2 are denoted as a beam parameter 1 and a beam parameter 2. In this case, the SSB 1 and the beam parameter 1 are associated with random access information 1, and the SSB 1 and the beam parameter 2 may be associated with random access information 2. In this way, different satellite beams that use a same SSB may be distinguished by using beam parameters of the satellite beams. Elements in the random access information 1 and the random access information 2 are completely different, and quantities of elements may be equal or different.

The first SSB is an SSB that is selected by the terminal and that needs to be reported. During actual application, the terminal detects or receives a plurality of SSBs when accessing a satellite, and selects an SSB from the plurality of SSBs as the first SSB. The terminal determines a satellite beam corresponding to the first SSB. The terminal determines the first random access information associated with the first SSB and associated with the beam parameter of the satellite beam.

If a plurality of satellite beams use a same SSB, it may be considered that the SSB is associated with the plurality of satellite beams. The terminal or the satellite may determine, based on the association relationship between the SSB and the satellite beams, the satellite beams associated with the SSB.

S502: The terminal sends a preamble to the satellite based on the first random access information. The satellite receives the preamble from the terminal.

S503: The satellite determines, based on the received first random access information, a satellite beam selected by the terminal.

Specifically, the satellite determines, based on the received first random access information, the first SSB and the beam parameter of the satellite beam that are associated with the first random access information, and further determines a satellite beam selected by the terminal.

For example, the satellite determines, based on the received preamble and/or a random access resource, the satellite beam selected by the terminal.

S504: The satellite sends downlink data on the satellite beam selected by the terminal.

Random access information may be a random access preamble (preamble). For example, the first SSB is associated with N preambles. The N preambles include a plurality of preamble subsets. A subset means one or more preambles. A plurality of beam parameters of the satellite beams are in a one-to-one correspondence with the plurality of preamble subsets. For example, the beam parameter 1 of the satellite beam is associated with a preamble subset 1, and the beam parameter 2 of the satellite beam is associated with a preamble subset 2. In this way, the terminal may determine a preamble subset based on the first SSB and a beam parameter of a satellite beam. The terminal selects a preamble from the preamble subset and sends the preamble to the satellite. The satellite may determine, based on the received preamble and the association relationship, the satellite beam selected by the terminal. Then, the satellite sends the downlink data on the satellite beam selected by the terminal.

The random access information may alternatively be a random access resource. The random access resource may be a physical random access channel (physical random access channel, PRACH) resource, or in another form. The PRACH resource may be represented by a PRACH transmission occasion (RACH occasion, RO). One RO represents a time-frequency resource used to transmit a preamble, includes one or more subcarriers in frequency domain, and includes one or more time domain symbols in time domain. For example, the first SSB is associated with M ROs, and the M ROs include a plurality of RO subsets. A subset means one or more ROs. The plurality of beam parameters of the satellite beams are in a one-to-one correspondence with the plurality of RO subsets. For example, the beam parameter 1 of the satellite beam is associated with an RO subset 1, and the beam parameter 2 of the satellite beam is associated with an RO subset 2. In this way, the terminal may determine an RO subset based on the first SSB and a beam parameter of a satellite beam. The terminal selects an RO from the RO subset, and sends the preamble on the selected RO. Herein, the preamble sent by the terminal may be any preamble selected from all preambles associated with the first SSB. Alternatively, the preamble may be determined based on the correspondence between the beam parameters and the preamble subsets. In this way, it is equivalent to that the beam parameters are corresponding to both the preambles and the random access resources. The satellite may determine, based on an RO of the received preamble and the association relationship, the satellite beam selected by the terminal. Alternatively, if the beam parameters are corresponding to both the preambles and the random access resources, the satellite determines, based on the received preamble, the RO of the received preamble, and the correspondence, the satellite beam selected by the terminal. The satellite sends the downlink data on the satellite beam selected by the terminal.

In conclusion, the beam parameter of the satellite beam is added as a parameter associated with the random access information, so that when a same SSB is sent on a plurality of satellite beams, different satellite beams can be successfully distinguished. The SSB does not need to be in a one-to-one correspondence with the satellite beams, and the satellite beams may be reported. When the satellite has a large quantity of beams, a small quantity of SSBs may be used to support sweeping of a large quantity of beams, so that SSB-based beam selection or reporting can be more easily implemented in the satellite field. In addition, if a coverage area of the satellite is divided into cells, because one SSB in combination with beam parameters may represent a plurality of beams, a maximum quantity of beams supported by one cell may be larger, and a quantity of cells obtained through division into the coverage area of the satellite may be reduced, so that a handover frequency of a terminal between cells is reduced, air interface resources are saved, and power consumption of the terminal is reduced.

The following provides several possible forms of the beam parameter of the satellite beam. It may be understood that a parameter that can be used to distinguish a satellite beam is not limited to the several forms listed below.

1. The beam parameter of the satellite beam is an attribute of a Doppler offset value.

The attribute of the Doppler offset value is positive or negative. The Doppler offset value may be considered as a Doppler offset value of a downlink signal sent by the satellite. The Doppler offset value may alternatively be considered as a Doppler offset value of the satellite beam. The Doppler offset value may alternatively be considered as a Doppler offset value of the SSB. The SSB is a downlink signal. The satellite beam is used to carry the downlink signal, or the satellite sends the downlink signal on the satellite beam.

The terminal detects an attribute of the Doppler offset value of the downlink signal or SSB. That is, after determining the first SSB, the terminal detects whether the attribute of the Doppler offset value of the downlink signal or first SSB is positive or negative.

Alternatively, the terminal determines the attribute of the Doppler offset value by using the satellite. The satellite sends, to the terminal, information which is denoted as first information. The first information is used to indicate the attribute of the Doppler offset value. The terminal determines the attribute of the Doppler offset value based on the first information.

Based on the foregoing descriptions, an example in which the first SSB is associated with the second random access information is used. The second random access information includes the first random access information and third random access information. The first random access information has an association relationship with both the first SSB and the beam parameter of the satellite beam.

When the beam parameter of the satellite beam is the attribute of the Doppler offset, the following associations may exist.

Association 1: The attribute of the Doppler offset value of the satellite beam is positively associated with the first random access information, and the attribute of the Doppler offset value of the satellite beam is negatively associated with the third random access information.

Association 2: Alternatively, the attribute of the Doppler offset value of the satellite beam is negatively associated with the first random access information, and the attribute of the Doppler offset value of the satellite beam is positively associated with the third random access information.

That is, the positive attribute of the Doppler offset value of the satellite beam and the negative attribute of the Doppler offset value of the satellite beam are associated with two different subsets in the second random access information. An intersection set of the two subsets is empty. The subset may also be referred to as a candidate set.

If the attribute of the Doppler offset value is positive, it may be understood that the Doppler offset value is positive. If the attribute of the Doppler offset value is negative, it may be understood that the Doppler offset value is negative.

Figure 6A:
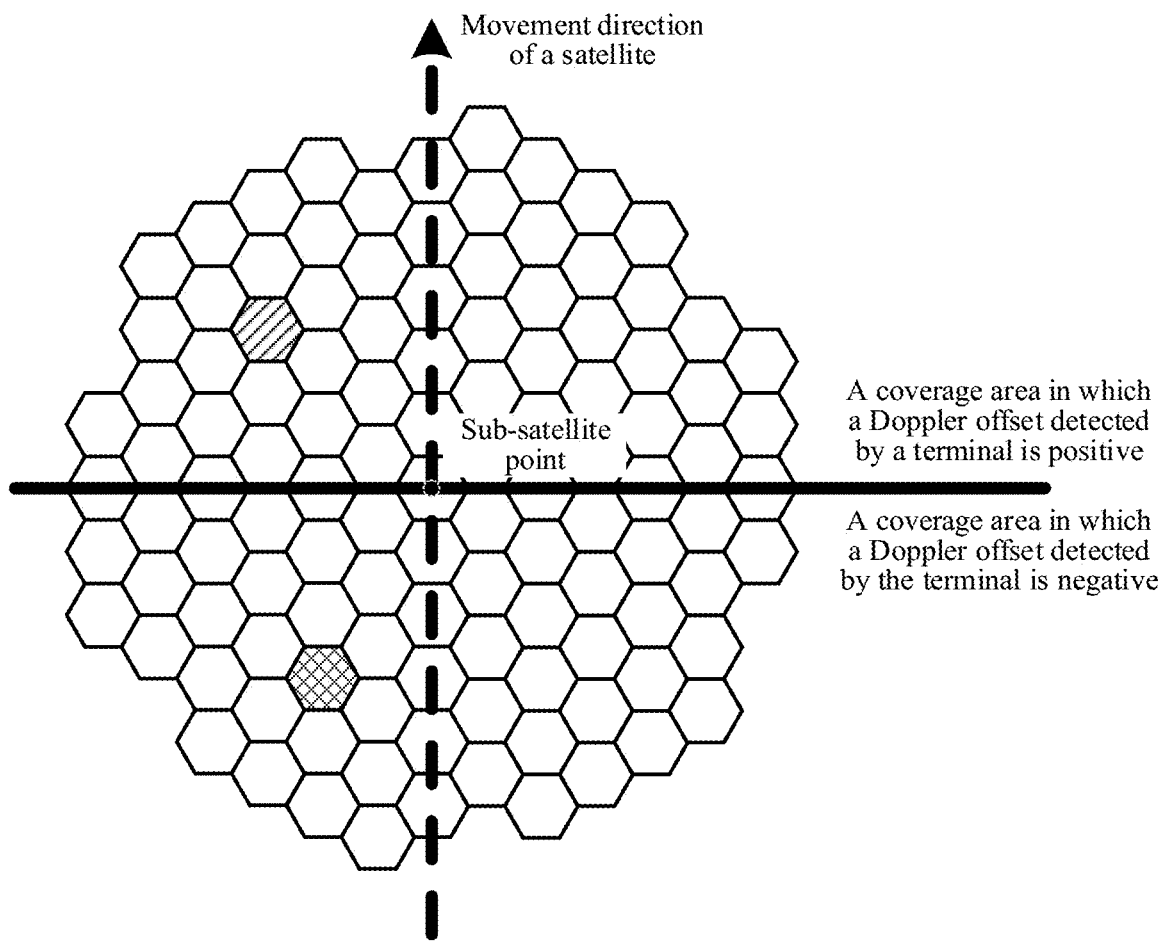
FIG. 6a is a schematic diagram 1 of satellite beam coverage according to an embodiment of this application.
Figure 6B:
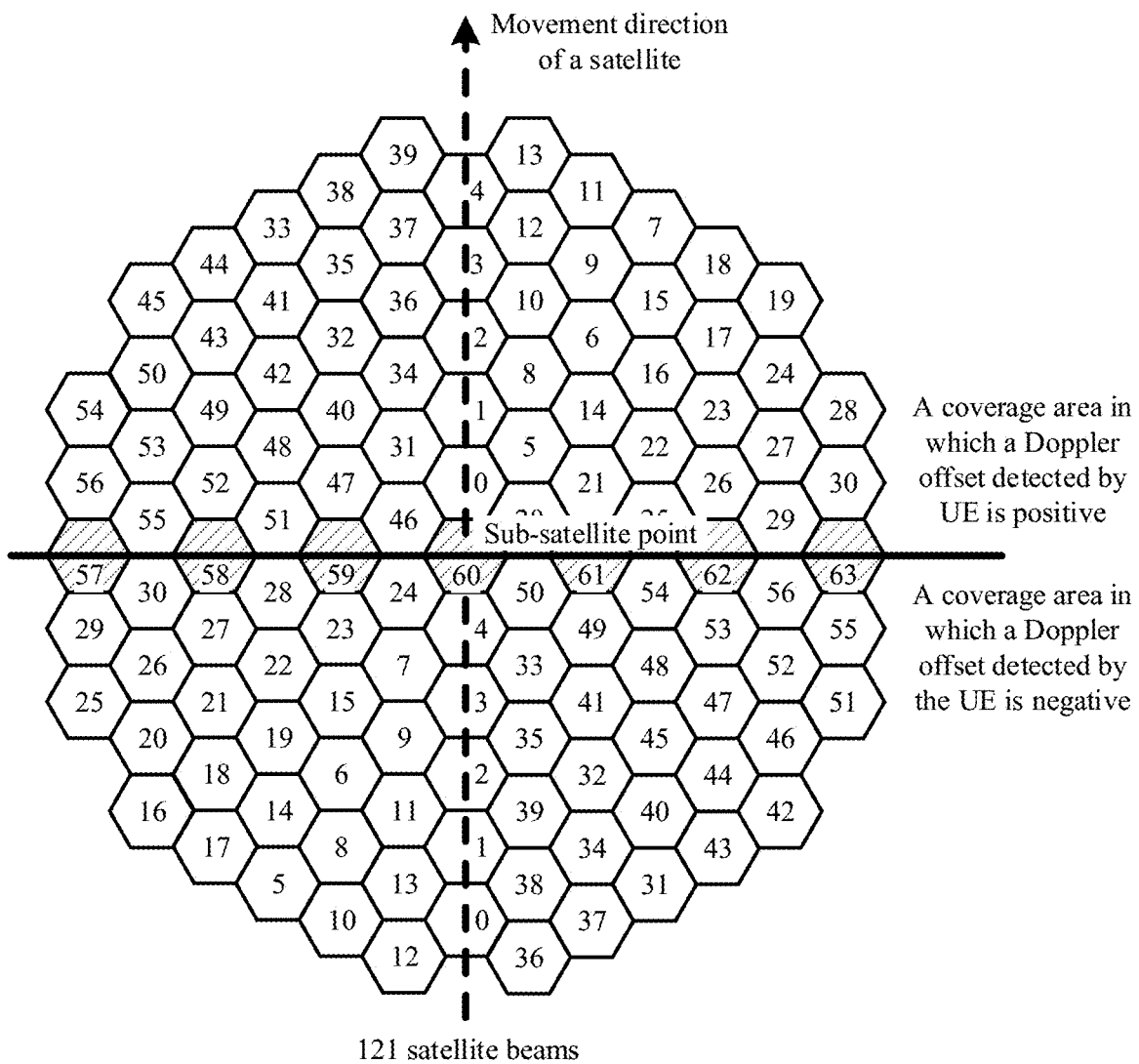
FIG. 6b is a schematic diagram 2 of satellite beam coverage according to an embodiment of this application.

Examples are used below for description. As shown in FIG. 6a and FIG. 6b, there are a plurality of satellite beams in a coverage area of a low Earth orbit satellite. In FIG. 6a and FIG. 6b, one hexagon is corresponding to one satellite beam. Satellite beams in each of FIG. 6a and FIG. 6b may be divided into two areas based on positive or negative Doppler offset values of the downlink signal: an area in which the attribute of the Doppler offset value is positive and an area in which the attribute of the Doppler offset value is negative. FIG. 6b shows a correspondence between 121 satellite beams in the two areas in the coverage area of the satellite. The satellite beams are numbered as shown in FIG. 6b, and two beams with a same sequence number may be associated with a same SSB. It may be understood that FIG. 6a and FIG. 6b are merely examples.

As shown in FIG. 6a, the satellite broadcasts a same SSB (first SSB) for a slash-covered satellite beam and a grid-covered satellite beam. The N preambles associated with the first SSB include a subset A and a subset B, which are alternatively referred to as a candidate set A and a candidate set B. Preambles in the two candidate sets are completely different. In addition, quantities of preambles in the two candidate sets may be the same or different. Different quantities of preambles may be allocated to the candidate sets based on requirements. For example, when a carrier frequency is greater than 6 GHz, a system supports a maximum of 64 SSBs. The first SSB is associated with 60 preambles with sequence numbers 0 to 59. The candidate set A includes the preambles with sequence numbers 0 to 29, and the candidate set B includes the preambles with sequence numbers 30 to 59.

It is assumed that the attribute of the Doppler offset value is positively associated with the candidate set A, and the attribute of the Doppler offset value is negatively associated with the candidate set B. When selecting the slash-covered satellite beam, the terminal determines the candidate set A that is associated with the first SSB and positively associated with the attribute of the Doppler offset value of the satellite beam, and selects a preamble from the candidate set A to send the preamble to the satellite. The satellite determines, based on the received preamble and the association relationship, that the beam selected by the terminal is the slash-covered satellite beam. When selecting the grid-covered satellite beam, the terminal determines the candidate set B that is associated with the first SSB and negatively associated with the attribute of the Doppler offset value of the satellite beam, and selects a preamble from the candidate set B to send the preamble to the satellite. The satellite determines, based on the received preamble and the association relationship, that the beam selected by the terminal is the grid-covered satellite beam.

The random access information may alternatively be a random access resource. For example, the random access resource is an RO. The M ROs associated with the first SSB include a subset A and a subset B, which are alternatively referred to as a candidate set A and a candidate set B, or referred to as a group A and a group B. ROs in the two candidate sets are completely different. In addition, quantities of ROs in the two candidate sets may be the same or different. Different quantities of ROs may be allocated to the candidate sets based on requirements. For example, the first SSB is associated with eight ROs with sequence numbers RO 0 to RO 7. The candidate set A includes the RO 0 to the RO 3, and the candidate set B includes the RO 4 to the RO 7.

It is assumed that the attribute of the Doppler offset value is positively associated with the candidate set A, and the attribute of the Doppler offset value is negatively associated with the candidate set B. When selecting the slash-covered satellite beam, the terminal determines the candidate set A that is associated with the first SSB and positively associated with the attribute of the Doppler offset value of the satellite beam, and selects an RO from the candidate set A to send a preamble to the satellite. The satellite determines, based on an RO of the received preamble and the association relationship, that the beam selected by the terminal is the slash-covered satellite beam. When selecting the grid-covered satellite beam, the terminal determines the candidate set B that is associated with the first SSB and negatively associated with the attribute of the Doppler offset value of the satellite beam, and selects an RO from the candidate set B to send a preamble to the satellite. The satellite determines, based on an RO of the received preamble and the association relationship, that the beam selected by the terminal is the grid-covered satellite beam.

Certainly, the random access information may include both a random access resource and a preamble.

It can be learned from FIG. 6a and FIG. 6b that a straight line that passes through a sub-satellite point and that is perpendicular to a movement direction of the satellite passes through some beams, attributes of Doppler offset values of upper half parts of the beams are positive, and attributes of Doppler offset values of lower half parts of the beams are negative. That is, these beams cannot be distinguished by using the positive and negative attributes of the Doppler values, and these beams may be referred to as special beams. For a special beam, the satellite does not pair the special beam with another beam, that is, broadcasts one SSB on only one special beam. If the terminal is located in the upper half part of the special beam, the terminal obtains that the attribute of the Doppler offset value is positive, and selects a preamble and/or an RO based on the association relationship established between the attribute of the Doppler offset value and the random access information. For example, the attribute of the Doppler offset value is positively associated with the candidate set A, a preamble and/or an RO are selected from the candidate set A, and a preamble is sent to the satellite based on the selected preamble and/or RO. If the terminal is located in the lower half part of the special beam, the terminal obtains that the attribute of the Doppler offset value is negative, and selects a preamble and/or an RO based on the association relationship established between the attribute of the Doppler offset value and the random access information. For example, the attribute of the Doppler offset value is positively associated with the candidate set B, a preamble and/or an RO are selected from the candidate set B, and a preamble is sent to the satellite based on the selected preamble and/or RO. If the terminal is just located on the straight line that passes the sub-satellite point and that is perpendicular to the movement direction of the satellite, the Doppler offset value detected or obtained by the terminal is 0. Based on the association relationship established between the attribute of the Doppler offset value and the random access information, the terminal randomly or arbitrarily selects a preamble and/or an RO from the random access information positively associated with the attribute of the Doppler offset value, or selects a preamble and/or an RO from the random access information negatively associated with the attribute of the Doppler offset value.

2. The beam parameter of the satellite beam is an attribute of a Doppler compensation value.

When a Doppler (Doppler) offset occurs between the satellite and a terminal in a beam due to relative motion, Doppler pre-compensation needs to be performed before the satellite sends a downlink signal. The satellite may notify the terminal of a pre-compensation value or a value related to the pre-compensation value through broadcast or separate sending, and the terminal may perform Doppler pre-compensation on uplink data by using the pre-compensation value or the value related to the pre-compensation value.

Based on this, the satellite broadcasts a Doppler (doppler)-related parameter, for example, the pre-compensation value or the value related to the pre-compensation value. The Doppler-related parameter is broadcast on a satellite beam, or the satellite separately sends a Doppler-related parameter of the satellite beam to the terminal. Alternatively, the Doppler-related parameter may be broadcast or separately sent for a user (or a terminal).

Optionally, the satellite broadcasts information about the Doppler-related parameter (for example, in a form of a table) in a cell, and the terminal obtains the Doppler-related parameter by looking up the table based on an index received by the terminal.

Because Doppler-related parameters are broadcast on a satellite beam, or are sent separately for one beam, the Doppler-related parameters may be used to distinguish a plurality of beams of a same SSB.

An example in which the Doppler-related parameter is a Doppler compensation value is used below for description. The Doppler compensation value may be a pre-compensation value or a value related to the pre-compensation value.

The Doppler compensation value includes an uplink compensation value or a downlink compensation value.

The terminal receives an attribute of a Doppler compensation value corresponding to each of a plurality of satellite beams from the satellite, and determines the attribute of the Doppler compensation value corresponding to the satellite beam on which the terminal is located. Alternatively, the terminal receives, from the satellite, the attribute of the Doppler compensation value corresponding to the satellite beam on which the terminal is located. The attribute of the Doppler compensation value is positive or negative. If the attribute of the Doppler compensation value is positive, it may be understood that the Doppler compensation value is positive. If the attribute of the Doppler compensation value is negative, it may be understood that the Doppler compensation value is negative.

For example, the first SSB is associated with the second random access information. The second random access information includes the first random access information and third random access information. The first random access information has an association relationship with both the first SSB and the beam parameter of the satellite beam.

When the beam parameter of the satellite beam is the attribute of the Doppler compensation value, the following associations may exist.

Association 1: The Doppler compensation value of the satellite beam is positively associated with the first random access information, and the attribute of the Doppler compensation value of the satellite beam is negatively associated with the third random access information.

Association 2: The attribute of the Doppler compensation value of the satellite beam is negatively associated with the first random access information, and the Doppler compensation value of the satellite beam is positively associated with the third random access information.

That is, the positive Doppler compensation value of the satellite beam and the negative attribute of the Doppler compensation value of the satellite beam are associated with two different subsets in the second random access information. An intersection set of the two subsets is empty. The subset may also be referred to as a candidate set, a group, or another concept.

For example, the random access information is a preamble. The N preambles associated with the first SSB include a subset A and a subset B, which are alternatively referred to as a candidate set A and a candidate set B. Preambles in the two candidate sets are completely different. In addition, quantities of preambles in the two candidate sets may be the same or different. Different quantities of preambles may be allocated to the candidate sets based on requirements. For example, when a carrier frequency is greater than 6 GHz, a system supports a maximum of 64 SSBs. The first SSB is associated with 60 preambles with sequence numbers 0 to 59. The candidate set A includes the preambles with sequence numbers 0 to 29, and the candidate set B includes the preambles with sequence numbers 30 to 59.

It is assumed that the Doppler compensation value is positively associated with the candidate set A, and the attribute of the Doppler compensation value is negatively associated with the candidate set B. The terminal selects a preamble from the candidate set A or the candidate set B based on the attribute of the Doppler compensation value that is sent by the satellite and is corresponding to the satellite beam. For example, the terminal selects the preamble from the candidate set A based on a positive Doppler compensation value that is sent by the satellite and is corresponding to the satellite beam. The terminal selects the preamble from the candidate set B based on the negative attribute of the Doppler compensation value that is sent by the satellite and is corresponding to the satellite beam. The satellite determines, based on the received preamble and the association relationship, the beam selected by the terminal.

For the foregoing special beam, a Doppler compensation value that may be broadcast by the satellite on the special beam is 0. For the special beam, the satellite does not pair the special beam with another beam, that is, broadcasts one SSB on only one special beam. In this case, it may be specified that when the Doppler compensation value received by the terminal is 0, a resource (including an RO, a preamble, and the like) may be randomly selected from two different subsets (the first random access information and the third random access information) in the associated second random access information to send the random access preamble.

For a method when the random access information is a random access resource, refer to the related descriptions in which the beam parameter of the satellite beam is an attribute of a Doppler offset value. For other methods that are not used when the beam parameter of the satellite beam is an attribute of a Doppler compensation value, refer to the related descriptions in which the beam parameter of the satellite beam is an attribute of a Doppler offset value. The positive attribute of the Doppler compensation value is corresponding to the positive attribute of the Doppler offset value, and the negative attribute of the Doppler compensation value is corresponding to the negative attribute of the Doppler offset value. Repeated content is not described herein again.

3. The beam parameter of the satellite beam is an index number corresponding to the satellite beam.

A plurality of satellite beams are in a one-to-one correspondence with a plurality of index numbers. For example, a satellite beam on which the terminal is located is corresponding to a first index number. The index number may also be referred as a parameter, a sequence number, or another name.

Index numbers are used to distinguish different beams that broadcast a same SSB. For example, a beam 1 and a beam 2 send a same SSB 1, an index number of the beam 1 is 1, and an index number of the beam 2 is 2. In this case, the SSB 1 and the index number 1 are associated with random access information 1, and the SSB 1 and the index number 2 may be associated with random access information 2. In this way, different satellite beams that use a same SSB may be distinguished by using index numbers of the satellite beams. If the satellite sends a same SSB on p beams, the p beams may be distinguished by using p index numbers. In this way, the beams associated with the SSB is p times an original beam.

The satellite sends the correspondence between the plurality of satellite beams and the plurality of index numbers to the terminal, and the terminal receives the correspondence from the satellite. The terminal determines the first random access information associated with the first SSB and associated with the index number of the satellite beam.

For example, the first SSB is associated with the second random access information. The second random access information includes the first random access information and at least one piece of third random access information. For example, the satellite sends the same SSB on the p beams. In this case, the second random access information includes the first random access information and p−1 pieces of third random access information. An intersection set of the first random access information and any piece of third random access information is empty. The first random access information has an association relationship with both the first SSB and the index number of the satellite beam.

The first index number corresponding to the satellite beam on which the terminal is located is associated with the first random access information, and at least one second index number is in a one-to-one correspondence with the at least one piece of third random access information.

The satellite may broadcast a correspondence between a beam and an index number on a beam. For example, the satellite sends a broadcast message, where the broadcast message carries the plurality of index numbers corresponding to the plurality of beams, one beam is corresponding to one index number, and identifiers of the beams are carried in the broadcast message to distinguish the beams. Alternatively, the satellite sends, to the terminal, the index number corresponding to the beam on which the terminal is located.

For example, in the broadcast message or a message separately sent by the satellite to the terminal, an IE used to indicate the correspondence between the beam and the index number may have the following representation form.

| |
|---|
| beamsPerSSBAndSerialNumber CHOICE{ |
|    one                INTEGER(1), |
|    Two              INTEGER (1...2), |
|    Three          INTEGER (1...3), |
|    Four           INTEGER (1...4)} | beamsPerSSBAndSerialNumber indicates an index number corresponding to each beam associated with an SSB. CHOICE indicates options. INTEGER indicates an integer. For example, INTEGER (1 . . . 3) indicates that an integer may be selected from 1, 2, or 3. When CHOICE is 1 (one), it indicates that one beam is corresponding to one SSB. When CHOICE is 2 (Two), it indicates that two beams are corresponding to one SSB, and the terminal may determine, based on an index number carried in INTEGER (1 . . . 2), a specific value that is in the two index numbers and corresponding to the satellite beam on which the terminal is located. When CHOICE is 3 (Three), it indicates that three beams are corresponding to one SSB, and the terminal may determine, based on an index number carried in INTEGER (1 . . . 3), a specific value that is in the three index numbers and corresponding to the satellite beam. For example, the carried index number is 2. The terminal divides the second random access information into three groups. For example, the three groups include a group 1, a group 2, and a group 3, respectively corresponding to index numbers 1, 2, and 3. The terminal determines, based on the carried index number 2, the group 2 associated with the index number 2, and selects the first random access information from the group 2. A grouping manner and a correspondence between each group number and an index number may be agreed upon by the terminal and the satellite in advance, for example, specified in a protocol.

When CHOICE is 4 (Four), it indicates that four beams are corresponding to one SSB, and the terminal may determine, based on an index number carried in INTEGER (1 . . . 4), a specific value that is in the four index numbers and corresponding to the satellite beam on which the terminal is located.

An example in which CHOICE is 3 (Three) is used to describe a correspondence when the beam parameter of the satellite beam is an index number.

The first SSB is associated with 60 preambles with sequence numbers 0 to 59. The 60 preambles include three subsets or three candidate sets. A candidate set A includes the preambles with sequence numbers 0 to 19, a candidate set B includes the preambles with sequence numbers 20 to 39, and a candidate set C includes the preambles with sequence numbers 40 to 59.

When the index number is 1, the candidate set A is associated, and the terminal selects a preamble from the candidate set A to send the preamble to the satellite. The satellite determines, based on the received preamble and the association relationship, the beam selected by the terminal.

When the index number is 2, the candidate set B is associated, and the terminal selects a preamble from the candidate set B to send the preamble to the satellite. The satellite determines, based on the received preamble and the association relationship, the beam selected by the terminal.

When the index number is 3, the candidate set C is associated, and the terminal selects a preamble from the candidate set C to send the preamble to the satellite. The satellite determines, based on the received preamble and the association relationship, the beam selected by the terminal.

The random access information may alternatively be a random access resource. For example, the random access resource is an RO. The M ROs associated with the first SSB include a subset A, a subset B, and a subset C, which are alternatively referred to as a candidate set A, a candidate set B, and a candidate set C. ROs in the three candidate sets are completely different. In addition, quantities of ROs in the three candidate sets may be the same or different. Different quantities of ROs may be allocated to the candidate sets based on requirements. For example, the first SSB is associated with eight ROs with sequence numbers RO 0 to RO 7. The candidate set A includes the RO 0 to the RO 2, the candidate set B includes the RO 3 and the RO 4, and the candidate set C includes the RO 5 to the RO 7.

When the index number is 1, the candidate set A is associated, and the terminal selects an RO from the candidate set A and sends a preamble to the satellite on the selected RO. The satellite determines, based on an RO of the received preamble and the association relationship, the beam selected by the terminal.

When the index number is 2, the candidate set B is associated, and the terminal selects an RO from the candidate set B and sends a preamble to the satellite on the selected RO. The satellite determines, based on an RO of the received preamble and the association relationship, the beam selected by the terminal.

When the index number is 3, the candidate set C is associated, and the terminal selects an RO from the candidate set C and sends a preamble to the satellite on the selected RO. The satellite determines, based on an RO of the received preamble and the association relationship, the beam selected by the terminal.

Certainly, the random access information may include a combination of a preamble and an RO.

In this embodiment of this application, the satellite beam may be briefly described as a beam.

In this embodiment of this application, for a method for determining, by the network device, the satellite beam selected by the terminal, refer to a method for selecting, by the terminal, a satellite beam to be reported. For example, reference may be made to the descriptions of the referred association relationships.

In a possible implementation, the satellite sends indication information to the terminal, and the terminal receives the indication information from the satellite. The indication information is used to indicate a random access manner of the terminal. The random access manner includes: The terminal determines random access information based on the SSB, and initiates random access based on the determined random access information. Alternatively, the random access manner includes: The terminal determines random access information based on both the SSB and the parameter of the satellite beam, and initiates random access based on the determined random access information.

Initiating random access means sending a preamble to the satellite.

Alternatively, from another perspective, the indication information is used to indicate the terminal to determine the random access information based on a beam parameter of a first beam.

Alternatively, the indication information is used to indicate that the terminal does not need to determine the random access information based on the beam parameter of the first beam.

The terminal selects random access information for random access based on the indication information, to initiate random access.

Optionally, the indication information may be sent on a beam, in a cell, or for the terminal. The indication information may be sent through broadcast or a separate indication.

A representation form of a possible IE of the indication information is as follows:

beamsPerSSB INTEGER (1, p)

where p is a positive integer.

beamsPerSSB indicates a beam associated with each SSB. When beamsPerSSB=1, it indicates that different SSBs are broadcast on beams, and the UE does not select, based on a positive or negative Doppler offset value of a downlink signal, a candidate set and an RO resource group that are of a used preamble. When beamsPerSSB=2, it indicates that a same SSB is broadcast on two beams, and the beam is one of the beams. The UE selects, based on a positive or negative Doppler offset value of a downlink signal, a candidate set and an RO resource group that are of the used preamble.

The indication information method may be used in combination with various examples of the beam parameter in the foregoing embodiments.

In the foregoing embodiment provided in this application, the method provided in the embodiment of this application is separately described from a perspective of the terminal, the satellite, and interaction between the terminal and the satellite. To implement functions in the method provided in the embodiments of this application, a terminal and a satellite may include a hardware structure and/or a software module, to implement the functions in a form of a hardware structure, a software module, or a hardware structure and a software module. Whether a function in the foregoing functions is performed by using the hardware structure, the software module, or the combination of the hardware structure and the software module depends on particular applications and design constraints of the technical solutions.

Figure 7:
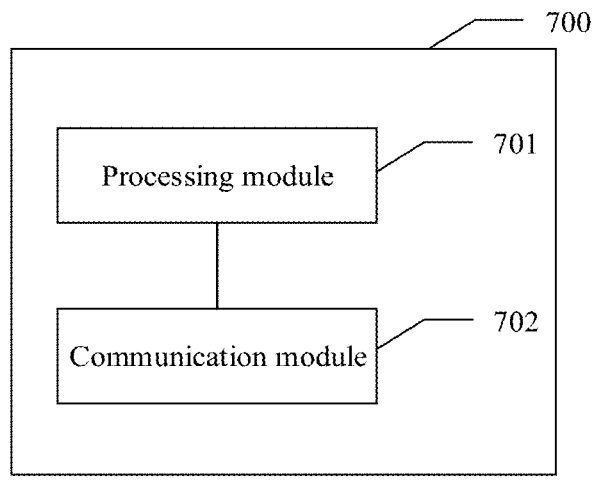
FIG. 7 is a schematic diagram 1 of a structure of an apparatus according to an embodiment of this application.

As shown in FIG. 7, based on a same technical concept, an embodiment of this application further provides an apparatus 700. The apparatus 700 may be a terminal or a satellite, may be an apparatus in the terminal or the satellite, or may be an apparatus that can be used in cooperation with the terminal or the satellite. In a design, the apparatus 700 may include modules that are in a one-to-one correspondence with the methods/operations/steps/actions performed by the terminal or the satellite in the foregoing method embodiments. The modules may be implemented by a hardware circuit, software, or a combination of a hardware circuit and software. In a design, the apparatus may include a processing module 701 and a communication module 702.

When the apparatus is configured to perform the method performed by the terminal:

the processing module 701 is configured to determine first random access information associated with a first synchronization broadcast block SSB and associated with a beam parameter of a satellite beam, where the beam parameter is used to distinguish the satellite beam; and the communication module 702 is configured to send a preamble to a satellite based on the first random access information.

When the apparatus is configured to perform the method performed by the satellite:

the communication module 702 is configured to: receive a preamble from a terminal, and determine first random access information; and the processing module 701 is configured to determine a first SSB and a beam parameter of a satellite beam that are associated with the first random access information.

The following describes some other operations that may further be performed by the processing module 701 or the communication module 702. For parts not described, mutual reference may be made to the method embodiments, and details are not described again.

Optionally, the beam parameter of the satellite beam includes an attribute of a Doppler offset value, and the attribute of the Doppler offset value is positive or negative.

Optionally, the processing module 701 is further configured to detect the attribute of the Doppler offset value; or the communication module 702 is further configured to receive first information from the satellite, where the first information is used to indicate the attribute of the Doppler offset value; and the processing module 701 is further configured to determine the attribute of the Doppler offset value based on the first information.

Optionally, the processing module 701 is further configured to send the first information to the terminal, where the first information is used to indicate the attribute of the Doppler offset value.

Optionally, the beam parameter of the satellite beam includes a first index number corresponding to the satellite beam; and the communication module 702 is further configured to receive the correspondence between the satellite beam and the first index number from the satellite.

Optionally, the beam parameter includes an attribute of a Doppler compensation value, and the attribute of the Doppler compensation value is positive or negative; and the communication module 702 is further configured to receive the attribute of the Doppler compensation value corresponding to the satellite beam from the satellite.

Optionally, the communication module 702 is further configured to send the attribute of the Doppler compensation value corresponding to the satellite beam to the terminal.

Optionally, the processing module 701 is configured to:

determine second random access information associated with the first SSB, where the second random access information includes the first random access information; and determine the first random access information that is in the second random access information and associated with the beam parameter of the satellite beam.

Optionally, the second random access information includes the first random access information and third random access information, and an intersection set of the first random access information and the third random access information is empty;

the attribute of the Doppler offset value of the satellite beam is positively associated with the first random access information, and the attribute of the Doppler offset value of the satellite beam is negatively associated with the third random access information; or the attribute of the Doppler offset value of the satellite beam is negatively associated with the first random access information, and the attribute of the Doppler offset value of the satellite beam is positively associated with the third random access information.

Optionally, the second random access information includes a subset of the first random access information and at least one piece of third random access information, and an intersection set of the first random access information and any piece of third random access information is empty;

the first index number corresponding to the satellite beam is associated with the first random access information; and at least one second index number is in a one-to-one correspondence with the at least one piece of third random access information.

Optionally, the second random access information includes a subset of the first random access information and a subset of third random access information, and an intersection set of the first random access information and the third random access information is empty;

the Doppler compensation value of the satellite beam is positively associated with the first random access information, and the attribute of the Doppler compensation value of the satellite beam is negatively associated with the third random access information; or the attribute of the Doppler compensation value of the satellite beam is negatively associated with the first random access information, and the Doppler compensation value of the satellite beam is positively associated with the third random access information.

Optionally, the first random access information includes a random access resource and/or the preamble.

In the foregoing descriptions, when the communication module 702 sends information or data to the terminal, this is an optional action performed on the satellite side. When the communication module 702 sends information or data to the satellite, this is an optional action performed on the terminal side.

Division into the modules in the embodiments of this application is an example, is merely division into logical functions, and may be other division during actual implementation. In addition, function modules in the embodiments of this application may be integrated into one processor, or each of the modules may exist alone physically, or two or more modules may be integrated into one module. The integrated module may be implemented in a form of hardware, or may be implemented in a form of a software function module.

Figure 8:
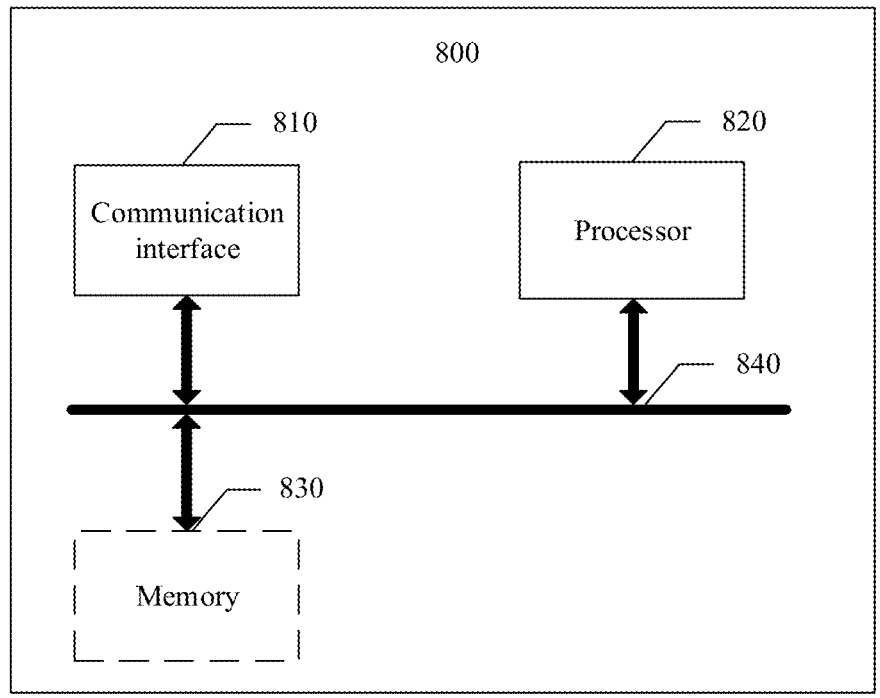
FIG. 8 is a schematic diagram 2 of a structure of an apparatus according to an embodiment of this application.

FIG. 8 shows an apparatus 800 according to an embodiment of this application. The apparatus 800 is configured to implement a function of the terminal or the satellite in the foregoing methods. When the function of the terminal is implemented, the apparatus may be a terminal, an apparatus in the terminal, or an apparatus that can be used in cooperation with the terminal. When the function of the satellite is implemented, the apparatus may be a satellite, an apparatus in the satellite, or an apparatus that can be used in cooperation with the satellite.

The apparatus may be a chip system. In this embodiment of this application, the chip system may include a chip, or may include a chip and another discrete component. The apparatus 800 includes at least one processor 820, configured to implement the function of the terminal or the satellite in the method provided in the embodiments of this application. The apparatus 1100 may further include a communication interface 810. In this embodiment of this application, the communication interface may be a transceiver, a circuit, a bus, a module, or a communication interface of another type, and is configured to communicate with another device by using a transmission medium. For example, the communication interface 810 is used by an apparatus in the apparatus 800 to communicate with the another device. For example, when the apparatus 800 is a terminal, the another device may be a satellite. When the apparatus 800 is a satellite, the another apparatus may be a terminal.

The processor 820 receives and sends data through the communication interface 810, and is configured to implement the method in the foregoing method embodiments. For example, when the function of the terminal is implemented, the processor 820 is configured to determine first random access information associated with a first synchronization broadcast block SSB and associated with a beam parameter of a satellite beam, where the beam parameter is used to distinguish the satellite beam. The communication interface 810 is configured to send a preamble to a satellite based on the first random access information.

When the apparatus is configured to perform the method performed by the satellite:

The communication interface 810 is configured to: receive the preamble from the terminal, and determine the first random access information.

The processor 820 is configured to determine the first SSB and the beam parameter of the satellite beam that are associated with the first random access information.

The apparatus 800 may further include at least one memory 830, configured to store program instructions and/or data. The memory 830 is coupled to the processor 820. The coupling in this embodiment of this application is indirect coupling or a communication connection between apparatuses, units, or modules for information exchange between the apparatuses, the units, or the modules, and may be in electrical, mechanical, or other forms. The processor 820 may operate in collaboration with the memory 830. The processor 820 may execute the program instructions stored in the memory 830. At least one of the at least one memory may be included in the processor.

In this embodiment of this application, a specific connection medium between the communication interface 810, the processor 820, and the memory 830 is not limited. In this embodiment of this application, in FIG. 8, the memory 830, the communication interface 810, and the processor 820 are connected by using a bus 840. The bus is represented by using a bold line in FIG. 8. A connection manner between other components is merely an example for description, and constitutes no limitation. The bus may be classified into an address bus, a data bus, a control bus, and the like. For ease of representation, only one bold line is used to represent the bus in FIG. 8, but this does not mean that there is only one bus or only one type of bus.

In the embodiments of this application, the processor may be a general-purpose processor, a digital signal processor, an application-specific integrated circuit, a field programmable gate array or another programmable logic device, a discrete gate or transistor logic device, or a discrete hardware component, and may implement or perform the methods, steps, and logical block diagrams disclosed in the embodiments of this application. The general-purpose processor may be a microprocessor, any conventional processor, or the like. The steps of the methods disclosed with reference to the embodiments of this application may be directly performed and completed by a hardware processor, or may be performed and completed by using a combination of hardware and software modules in the processor.

In the embodiments of this application, the memory may be a non-volatile memory such as a hard disk drive (hard disk drive, HDD) or a solid-state drive (solid-state drive, SSD), or may be a volatile memory (volatile memory) such as a random access memory (random-access memory, RAM). The memory is any other medium that can carry or store expected program code in a form of an instruction structure or a data structure and that can be accessed by a computer, but is not limited thereto. The memory in the embodiments of this application may alternatively be a circuit or any other apparatus that can implement a storage function, and is configured to store program instructions and/or data.

An embodiment of this application provides a computer storage medium that stores computer-readable instructions. When the computer-readable instructions are run on a communication apparatus, the communication apparatus is enabled to perform the foregoing method embodiments.

An embodiment of this application provides a computer program product including instructions. When the computer program product runs on a communication apparatus, the communication apparatus is enabled to perform the foregoing method embodiments.

Figure 9:
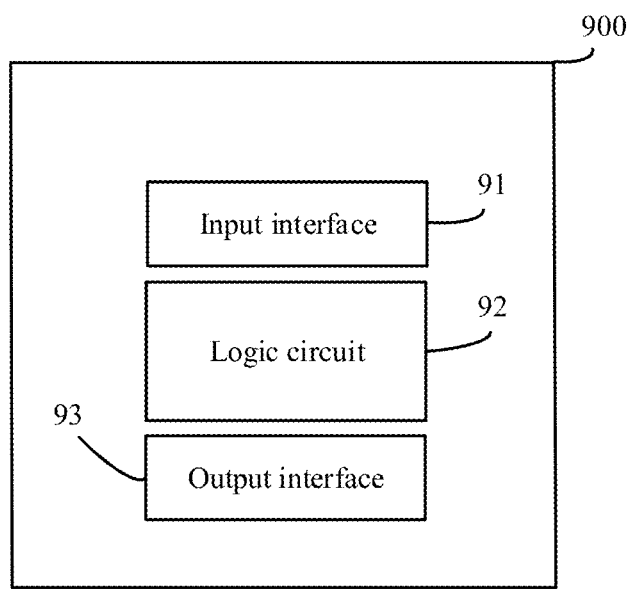
FIG. 9 is a schematic diagram 3 of a structure of an apparatus according to an embodiment of this application.

FIG. 9 shows an apparatus 900 according to an embodiment of this application. The apparatus 900 may be configured to perform the method performed by the foregoing terminal or satellite. The apparatus may be a communication device or a chip in the communication device. As shown in FIG. 9, the apparatus includes at least one input interface (input) 91, a logic circuit 92, and at least one output interface (output) 93.

When the apparatus is configured to perform the operation performed by the terminal:
the input interface 91 is configured to obtain a first SSB and a beam parameter of a satellite beam;
the logic circuit 92 is configured to determine first random access information associated with the first synchronization broadcast block SSB and associated with the beam parameter of the satellite beam, where the beam parameter is used to distinguish the satellite beam; and
the output interface 93 is configured to output the first random access information.

When the apparatus is configured to perform the operation performed by the satellite:
the input interface 91 is configured to receive a preamble from a terminal;
the logic circuit 92 is configured to: determine first random access information and a first SSB and a beam parameter of a satellite beam that are associated with the first random access information, and obtain a satellite beam selected by the terminal; and
the output interface 93 is configured to output the satellite beam.

Optionally, the logic circuit 92 may be a chip, an encoder, an encoding circuit, or another integrated circuit that can implement the method in this application.

Because specific methods and embodiments have been described above, for functions of the input interface 91, the logic circuit 92, or the output interface 93, refer to the related parts of the corresponding embodiments, and details are not described herein again.

Persons skilled in the art should understand that the embodiments of this application may be provided as methods, systems, or computer program products. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, a CD-ROM, an optical memory, and the like) that include computer usable program code.

This application is described with reference to the flowcharts and/or block diagrams of the methods, the devices (systems), and the computer program products according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

These computer program instructions may alternatively be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

These computer program instructions may alternatively be loaded onto the computer or the another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

Although some preferred embodiments of this application have been described, persons skilled in the art can make changes and modifications to these embodiments once they learn of the basic inventive concept. Therefore, the following claims are intended to be construed as to cover the preferred embodiments and all changes and modifications falling within the scope of this application.

It is clear that persons skilled in the art can make various modifications and variations to the embodiments of this application without departing from the spirit and scope of the embodiments of this application. In this case, this application is intended to cover these modifications and variations provided that they fall within the scope of protection defined by the following claims and their equivalent technologies.

What is claimed is:

1. A beam indication method, comprising:
determining, by a terminal device in a non-terrestrial network (NTN) system, first random access information associated with a first synchronization broadcast block (SSB) and a beam parameter that identifies a satellite beam from a plurality of satellite beams supported by the NTN system, wherein the plurality of satellite beams use the same first SSB, the plurality of satellite beams are distinguished by beam parameters, a total quantity of satellite beams supported by the NTN system is larger than a total quantity of SSBs supported by the NTN system, and the beam parameter that identifies the satellite beam comprises an attribute of a Doppler offset value or an attribute of a Doppler compensation value; and
sending, by the terminal device, a preamble to a satellite based on the first random access information.

2. The method according to claim 1, wherein the attribute of the Doppler offset value is positive or negative.

3. The method according to claim 1, further comprising obtaining the attribute of the Doppler offset value, wherein obtaining the attribute of the Doppler offset value comprises:
detecting, by the terminal device, the attribute of the Doppler offset value; or
receiving, by the terminal device, first information from the satellite, wherein the first information indicates the attribute of the Doppler offset value, and determining, by the terminal device, the attribute of the Doppler offset value based on the first information.

4. The method according to claim 1, wherein the beam parameter of the satellite beam comprises a first index number corresponding to the satellite beam, and the first index number corresponding to the satellite beam is associated with the first random access information; and
the method further comprises: receiving, by the terminal device, the first index number from the satellite.

5. The method according to claim 1, wherein the attribute of the Doppler compensation value is positive or negative; and
the method further comprises:
receiving, by the terminal device and from the satellite, the attribute of the Doppler compensation value corresponding to the satellite beam.

6. The method according to claim 1, wherein the determining, by a terminal device, first random access information associated with a first SSB and associated with a beam parameter of a satellite beam comprises:
determining, by the terminal device, second random access information associated with the first SSB, wherein the second random access information comprises the first random access information; and
determining, by the terminal device, the first random access information in the second random access information and associated with the beam parameter of the satellite beam.

7. The method according to claim 6, wherein:
the second random access information comprises the first random access information and third random access information, and
an intersection set of the first random access information and the third random access information is empty.

8. The method according to claim 6, wherein the second random access information comprises a subset of the first random access information and a subset of third random access information, and an intersection set of the first random access information and the third random access information is empty.

9. The method according to claim 1, wherein the first random access information comprises at least one of a random access resource or the preamble.

10. The method according to claim 1, wherein:
the attribute of the Doppler offset value comprises a Doppler offset value of a downlink signal sent by the satellite, a Doppler offset value of the satellite beam, or a Doppler offset value of the first SSB, and
the attribute of the Doppler compensation value comprises a Doppler pre-compensation value or a value related to the Doppler pre-compensation value.

11. An apparatus in a non-terrestrial network (NTN) system, comprising:
at least one processor; and
one or more memories including computer-executable instructions that, when executed by the at least one processor, cause the apparatus to:
determine first random access information associated with a first synchronization broadcast block (SSB) and a beam parameter that identifies a satellite beam from a plurality of satellite beams supported by the NTN system, wherein the plurality of satellite beams use the same first SSB, the plurality of satellite beams are distinguished by beam parameters, a total quantity of satellite beams supported by the NTN system is larger than a total quantity of SSBs supported by the NTN system, and the beam parameter that identifies the satellite beam comprises an attribute of a Doppler offset value or an attribute of a Doppler compensation value; and
send a preamble to a satellite based on the first random access information.

12. The apparatus according to claim 11, wherein the attribute of the Doppler offset value is positive or negative.

13. The apparatus according to claim 11, wherein the computer-executable instructions, when executed by the at least one processor, further cause the apparatus to obtain the attribute of the Doppler offset value by operation comprising:
detecting the attribute of the Doppler offset value; or
receiving first information from the satellite, wherein the first information indicates the attribute of the Doppler offset value, and determining the attribute of the Doppler offset value based on the first information.

14. The apparatus according to claim 11, wherein the beam parameter of the satellite beam comprises a first index number corresponding to the satellite beam, and the first index number corresponding to the satellite beam is associated with the first random access information, and wherein the computer-executable instructions, when executed by the at least one processor, further cause the apparatus to:
receive the first index number from the satellite.

15. The apparatus according to claim 11, wherein the attribute of the Doppler compensation value is positive or negative, and wherein the computer-executable instructions, when executed by the at least one processor, further cause the apparatus to:
receive the attribute of the Doppler compensation value corresponding to the satellite beam from the satellite.

16. The apparatus according to claim 11, wherein the computer-executable instructions, when executed by the at least one processor, further cause the apparatus to:
determine second random access information associated with the first SSB, wherein the second random access information comprises the first random access information; and
determine the first random access information that is in the second random access information and associated with the beam parameter of the satellite beam.

17. The apparatus according to claim 16, wherein the second random access information comprises the first random access information and third random access information, and an intersection set of the first random access information and the third random access information is empty.

18. The apparatus according to claim 16, wherein the second random access information comprises a subset of the first random access information and a subset of third random access information, and an intersection set of the first random access information and the third random access information is empty.

19. The apparatus according to claim 11, wherein the first random access information comprises at least one of a random access resource or the preamble.

20. A beam indication method, comprising:
determining, by a terminal device in a non-terrestrial network (NTN) system, first random access information associated with a first synchronization broadcast block (SSB) and a beam parameter that identifies a satellite beam from a plurality of satellite beams supported by the NTN system, wherein the plurality of satellite beams use the same first SSB, the plurality of satellite beams are distinguished by beam parameters, a total quantity of satellite beams supported by the NTN system is larger than a total quantity of SSBs supported by the NTN system, and the beam parameter that identifies the satellite beam comprises an attribute of a Doppler offset value or an attribute of a Doppler compensation value;
sending, by the terminal device, a preamble to a satellite based on the first random access information;
receiving, by the satellite, the preamble from the terminal device;
determining, by the satellite, the first random access information; and
determining, by the satellite, the first SSB and the beam parameter that identifies the satellite beam that are associated with the first random access information.

21. The method according to claim 20, further comprising: performing, by the satellite, sweeping of a plurality of beams simultaneously.

* * * * *

UNITED STATES PATENT AND TRADEMARK OFFICE
CERTIFICATE OF CORRECTION

PATENT NO. : 12,063,695 B2
APPLICATION NO. : 17/706202
DATED : August 13, 2024
INVENTOR(S) : Xiaolu Wang et al.

Page 1 of 1

It is certified that error appears in the above-identified patent and that said Letters Patent is hereby corrected as shown below:

On the Title Page

In Column 2 item (57) (Abstract), In Line 1-2, Delete "apparatuses" and insert -- apparatuses. --.

In Column 2 item (57) (Abstract), In Line 4, Delete "synchronization broadcast block (SSB)" and insert -- synchronization signal broadcast block (SSB) --.

Signed and Sealed this
Twenty-sixth Day of November, 2024

Katherine Kelly Vidal
*Director of the United States Patent and Trademark Office*